United States Patent Office 3,453,583
Patented July 1, 1969

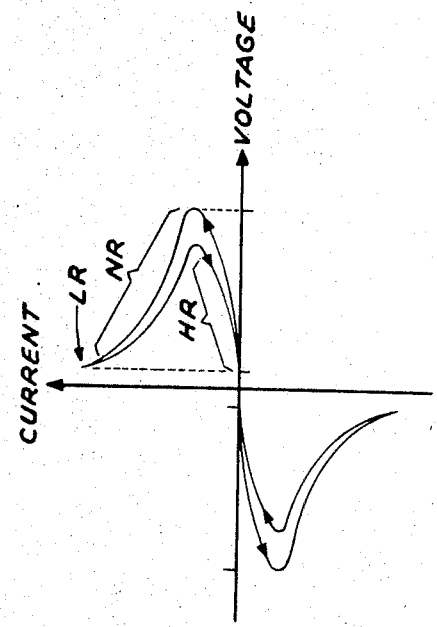
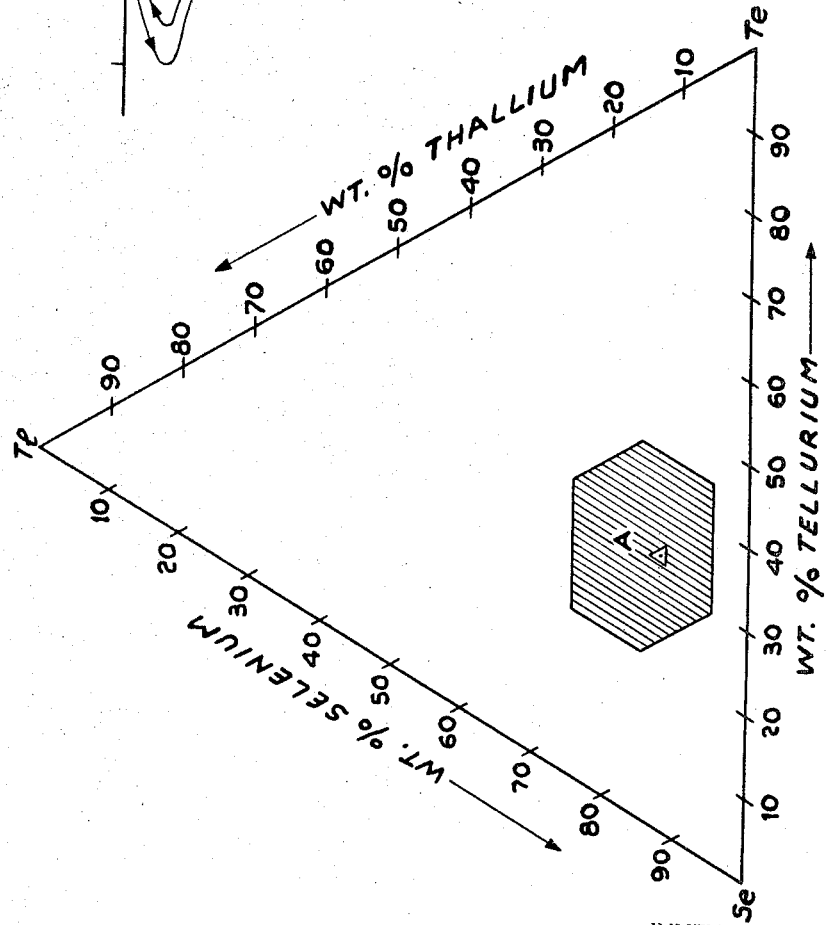

3,453,583
NONRECTIFYING SOLID STATE ELEMENT
Daniel J. Shanefield, New York, N.Y., James H. Battle, Boonton, and Emery W. Currier, Bloomfield, N.J., assignors to International Telephone and Telegraph Corporation, Nutley, N.J., a corporation of Maryland
Filed Feb. 23, 1967, Ser. No. 618,199
Int. Cl. H01c 7/10
U.S. Cl. 338—20
3 Claims

ABSTRACT OF THE DISCLOSURE

A semiconductive glass composition of the ternary group thallium-tellurium-selenium. The glass has a voltage current characteristic intially exhibiting relatively high resistance. As the applied voltage is increased, a form of "breakover" occurs in which the voltage-current characteristic exhibits negative incremental resistance. If after "breakover" has occured the applied voltage is maintained at a predetermined sustaining value, the glass exhibits relatively low electrical resistance. The glass is stable only in its high resistance state, and reverts to this state when the applied voltage is removed.

Related applications and patents

The semiconducting glasses described herein are generally related to the materials and devices described in U.S. Patents Nos. 3,117,013, 3,241,009 and 3,271,591, as well as U.S. patent application Nos. 537,187 (filed Mar. 24, 1966), 605,528 (filed Dec. 21, 1966) and 557,944 (filed June 16, 1966), all said applications being assigned to the assignee of the instant application.

Background of the invention

This invention relates to the field of semiconducting glasses and more particularly to glasses having voltage-current characteristics exhibiting negative incremental resistance.

Semiconducting glasses which exhibit two or more physical states having different electrical characteristics are well known in the art. These states are characteristic of the bulk of the material, the devices embodying such materials being nonrectifying and capable of being electrically switched between the various states thereof.

The physical phenomena presently believed to be responsible for the electrically inducible physical state changes exhibited by these materials are described in detail in copending applications Nos. 537,187 and 557,944. Briefly, however, it is believed that one state of the material is characterized by a relatively high resistance noncrystalline (perhaps locally ordered but macroscopically amorphous or polycrystalline) bulk structure, while the other state is characterized by a relatively low resistance crystalline structure.

Devices fabricated utilizing these semiconductive glasses as the active elements thereof are generally characterized as being either monostable or bistable. By the term "bistable" is meant a device which exhibits two stable physical states characterized by substantially different values of bulk resistivity (and therefore of resistance between the device electrodes), which is electrically switchable between the two resistance states, and which remains in a selected one of said states when the electrical control signals are terminated at the device electrodes.

By the term "monostable" is meant a device which exhibits a first physical state characterized by a relatively high bulk resistivity and a second physical state characterized by a relatively low bulk resistivity, the electrical transition between said states being characterized by a region of negative incremental resistance exhibited by the voltage-current characteristic of the device; the monostable device is by definition stable in only one of said first and second resistance states, and reverts to its stable state when the applied electrical signals are terminated at the device electrodes.

Materials for bistable devices having compositions from the ternary group arsenic-tellurium-iodine are disclosed in U.S. Patents Nos., 3,117,013 and 3,241,009. These devices generally exhibit rapid transitions between their relatively high and relatively low resistance states when the electrical control signal applied to the device electrodes exceeds a predetermined voltage or current threshold value. These devices do not exhibit a useful region of negative incremental resistance which is suitable for the construction of practical oscillators, amplifiers and other devices employing negative resistance effects. The greatest utility of such bistable devices resides in their use as switching and memory elements.

Negative incremental resistance effects in semiconducing glasses have been reported by B. T. Kolomiyets and E. A. Lebedev for certain compositions of the quaternary group thallium-arsenic-selenium-tellurium in a paper entitled "V-I Characteristic of a Point Contact With Vitreous Semiconductors." This paper appears in Radio Engineering and Electronic Physics, volume 8, 1941.

Some work has been done in investigating electrical properties of certain specific semiconductive glasses of the ternary group arsenic-tellurium-selenium, as reported in the following papers:

(1) B. T. Kolomiyets and T. F. Nazarova, "The Role of Impurity in the Conductivity of Vitreous $As_2SeTe_2$," Fizika Tverdogo Tela, volume 2, No. 1, pages 174–176, January 1960.

(2) T. N. Vengel and B. T. Kolomiyets, "Vitreous Semiconductors," Soviet Physics-Tech. Physics, volume 2, page 2314, 1957.

The semiconducting glasses disclosed in the aforementioned references, however, all are either bistable or have tendencies to become semipermanently and stably of low resistance after a prolonged period of device operation. The tendency of these prior art semiconductive glasses, which are initially in a high resistance state, to "lock" in the low resistance state is especially apparent when interrupted DC (such as half wave rectified 60 Hz. AC) is passed through the glass for a period of time on the order of 48 hours or more. When this locking condition occurs, the negative resistance region of the voltage-current characteristic of the glass virtually disappears.

Accordingly, an object of this invention is to provide monostable semiconductive glasses exhibiting improved stability against the tendency to lock in the low resistance condition when interrupted direct current is applied thereto. Another object of the invention is to provide monostable semiconductive glasses having a greater ratio (i) the resistance value exhibited in the high resistance state to (ii) the resistance value exhibited in the low resistance state. Other objects of the invention will become apparent by reference to the following detailed description and appended claims.

Summary

The invention herein is based upon the provision of novel semiconducting glass compositions, and devices fabricated therewith, of the ternary group thallium-tellurim-selenium, such glasses providing an improved differential between the high and low resistance states and exhibiting improved stability against the tendency of prior art semiconductive glasses to lock in the low resistance condition during operation thereof.

In the drawing

FIG. 1 shows a ternary diagram indicating the range of compositions according to the invention;

FIG. 2 shows the voltage-current characteristic of a monostable device incorporating a semiconductive glass according to a preferred embodiment of the invention; and FIG. 3 shows the circuit of a relaxation oscillator employing a monostable solid state device according to the invention.

Detailed description

FIG. 1 shows a ternary diagram for the novel range of compositions which applicants have discovered provide unexpectedly advantageous results over prior art materials when employed as monostable non-rectifying semiconductor elements, the compositions of this invention, by weight, being indicated by the shaded area A. Samples of compositions made for the purpose of obtaining this diagram were obtained by the following technique.

The starting materials for the preparation of these glasses consisted of high purity thallium, tellurium and selenium. Samples were prepared in clear fused quartz vials having the approximate dimensions of 5/16" inside diameter by 6" long. The weights of the elements required to form a product of a given composition were calculated so that after reaction the product would just fill a bulb at the bottom of the vial. The required quantities of thallium, tellurium, and selenium were weighed out in a dry nitrogen atmosphere and transferred to the quartz vial. The vial is then evacuated and sealed with a hydrogen torch. The sealed quartz vial was then placed inside a steel bomb with loosely fitting but securely fixed end caps. The bomb was then heated at 900° C. for 12 hours in a horizontal furnace having a combustion tube which rotated about its own axis during the firing. After the reaction, the bomb and its contents were allowed to cool in a vertical position so that the majority of the products would solidify in the bulb at the bottom of the vial. After cooling, the vial was removed from the steel bomb and small quantities of materials which had condensed in the upper portion of the tube were forced down into the bulb by heating the tube with a hydrogen torch. The tube was heated with a small hydrogen flame at a point just above the bulb until it collapsed and sealed. The tube above the collapsed portion was then drawn off and the section of the vial containing the product was then reheated in the steel bomb for a further 2 hours at 900° C. in the rotating tube furnace. After firing, the bomb and its contents were allowed to air-cool to room temperature.

A sample of the material was then utilized in fabrication of a bistable memory device by applying electrodes thereto in the manner described in U.S. Patent No. 3,241,009 commencing at column 5, line 30 thereof. The voltage-current characteristic of the resultant device was then plotted on an oscilloscope by applying a 60 Hz. AC sine wave to the device electrodes through a series resistance. The resultant voltage-current characteristic is shown in FIG. 2.

The following composition was found to exhibit especially desirable negative incremental resistance voltage-current characteristics, and is to be preferred: 33% tellurium, 12% thallium, 55% selenium, by weight.

The spacing between the electrodes was on the order of 0.015 inch. Each electrode was roughly circular with a diameter on the order of 0.020 inch. It was found that good characteristics were obtained with contacts having areas not exceeding a value corresponding to the area of a circular contact having a diameter on the order of 0.020 inch. It was also found that iron, nickel and tungsten made especially good contact materials and did not appear to degrade the characteristics of the bulk semiconductive material. Copper was found to be an especially poor contact material, having a tendency to cause "lock on" of the device in a low resistance state.

It should be understood that while U.S. Patents Nos. 3,117,013, 3,241,009 and 3,271,591 show specific configurations for making electrical contact to the semiconductive glass, it is possible to provide electrical contact to the glassy body in other ways.

The voltage-current characteristic shown in FIG. 2 and typical of the monostable semiconductive glasses according to the invention was found to be quite stable in comparison to that of semiconductive glasses heretofore known. It is evident that the device is nonrectifying, i.e. that the characteristics are substantially independent of the polarity of the applied voltage. It is also evident that the characteristic may be considered as having three distinct regions, viz. (i) a relatively high resistance region HR characterized by a relatively small current flow for applied voltages not exceeding a predetermined "break over" voltage, (ii) a negative resistance region NR characterized by negative incremental resistance, i.e. a region wherein the current through the device increases even though the voltage across the device terminals is decreasing and (iii) a region of relatively low resistance LR characterized by a relatively high current through the device at a relatively low applied voltage. The characteristic is seen to display some hysteresis, but returns to its high resistance region HR when the current through the device is externally decreased or the applied voltage is reduced below the "sustaining" level. The device is unstable in the low resistance region LR, i.e., the device can be maintained in this low resistance region only while an external electrical signal having specific characteristics is applied to the device electrodes. When this electrical signal is removed, the device reverts to its high resistance condition.

Devices employing semiconductive glasses according to our invention exhibit a ratio of high resistance (corresponding to the region HR) to low resistance (corresponding to the region LR) much greater than that exhibited by similar devices heretofore known. Therefore the glasses we have invented are especially suitable for use in telephone switching networks, where high "off" resistance (for reduction of cross-talk) and low "on" resistance (for smaller signal attenuation) are essential.

It is evident from FIG. 2 that the voltage-current characteristic of the device is current-controlled, i.e., is substantially single valued along the current axis. Therefore the device may be employed in circuitry wherever other types of current-controlled negative resistance elements are presently utilized. The device possesses the additional advantage of being insensitive to the polarity of the applied voltage, so that unique applications are possible for which other types of current controlled negative resistance elements heretofore known are not suitable.

FIG. 3 shows the circuit for a simple relaxation oscillator employing a monostable negative resistance semiconductive glass device according to the invention. The device was fabricated by contacting a cylindrical mass of monostable material having the composition 33% tellurium, 12% thallium, 55% selenium with a pair of spaced iron electrodes each having a circular contact area and a diameter on the order of 0.020 inch, one electrode being attached at each end of the glassy cylinder. Each electrode was electrically connected to the glassy body by means of a simple S-shaped resilient pressure contact. The resistor R has a maximum value of 10,000 ohms, the capacitor C has a value of 1 microfarad, and the battery B has a voltage rating of 90 volts. The load resistance $R_1$ has a range of 500 to 5000 ohms. The circuit operates as a sawtooth oscillator delivering substantial power to the load resistance $R_1$.

While the principles of the invention have been described above in connection with specific embodiments, and particular modifications thereof, it is to be clearly understood that this description is made only by way of example and not as a limitation on the scope of the invention.

We claim:

1. A nonrectifying solid state element having an electrical voltage-current characteristic including a state of relatively high resistance, a state of negative incremental resistance and a state of relatively low resistance, said electrical voltage characteristic being stable only in said high resistance state comprising:
   a body of semiconductive glass from the ternary group thallium-tellurium-selenium having a composition, by weight, within the shaded area A of FIG. 1 of the drawing; and
   at least two spaced electrodes in contact with said body.

2. A solid state element according to claim 1, wherein each of said electrodes comprises a metal selected from the group consisting of iron, nickel and tungsten.

3. A non-rectifying solid state element according to claim 1, wherein said composition comprises, by weight, 33% tellurium, 12% thallium, and 55% selenium.

References Cited

UNITED STATES PATENTS

| 3,110,685 | 11/1963 | Offergeld | 252—512 |
| 3,348,045 | 10/1967 | Brau et al. | 106—47 |

FOREIGN PATENTS

| 248,838 | 1/1964 | Australia. |

OTHER REFERENCES

Academy of Sciences, U.S.S.R. bulletin, Physical Series, vol. 20 (12), 1956, Goriunova et al., pp. 1372–1376.

A. D. Pearson: The Glass Industry, December 1964, pp. 666–669.

REUBEN EPSTEIN, *Primary Examiner.*

U.S. Cl. X.R.

106—47; 252—512